(12) United States Patent
Yuan et al.

(10) Patent No.: US 11,942,054 B2
(45) Date of Patent: Mar. 26, 2024

(54) DRIVING METHOD OF DISPLAY DEVICE, AND DISPLAY DEVICE

(71) Applicant: HKC CORPORATION LIMITED, Shenzhen (CN)

(72) Inventors: Zhenghui Yuan, Shenzhen (CN); Tao Fan, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/088,740

(22) Filed: Dec. 26, 2022

(65) Prior Publication Data

US 2023/0368746 A1 Nov. 16, 2023

(30) Foreign Application Priority Data

May 13, 2022 (CN) .......................... 202210517373.0

(51) Int. Cl.
*G09G 3/36* (2006.01)

(52) U.S. Cl.
CPC ......... *G09G 3/3614* (2013.01); *G09G 3/3607* (2013.01); *G09G 3/3688* (2013.01);
(Continued)

(58) Field of Classification Search
CPC .. G09G 3/3614; G09G 3/3607; G09G 3/3688; G09G 2320/0271; G09G 2320/029; G09G 2330/021
See application file for complete search history.

(56) References Cited

U.S. PATENT DOCUMENTS

| | | | | |
|---|---|---|---|---|
| 2008/0284700 A1* | 11/2008 | Oke | ..................... | G09G 3/3614 345/87 |
| 2013/0088528 A1* | 4/2013 | Borgers | ............... | G09G 3/3648 345/690 |

(Continued)

FOREIGN PATENT DOCUMENTS

| | | |
|---|---|---|
| CN | 103366707 A | 10/2013 |
| CN | 106710563 A | 5/2017 |

(Continued)

OTHER PUBLICATIONS

Zhuang, Yiqian, the ISA written comments, dated Mar. 2023, CN.
Zhuang, Yiqian, the International Search Report, dated Mar. 2023, CN.

*Primary Examiner* — David Tung (57) ABSTRACT

A driving method of a display device and a display device are disclosed, the driving method including: detecting current pixel inversion mode; determining pixel polarities and first data signals for a next frame based on pixel polarities of a current frame and the inversion mode; determining whether the next frame is an overload image based on pixel bright-or-dark values and grayscale values corresponding to the next frame and those corresponding to the overload image; when the next frame is an overload image, modifying a pixel polarity order corresponding to the first data signals, and generating and outputting second data signals to drive the display device to display the next frame; otherwise outputting the first data signals to drive the display device to display the next frame. The pixel polarities corresponding to the first data signals are in a different order than those corresponding to the second data signals.

6 Claims, 5 Drawing Sheets

(52) U.S. Cl.
CPC ............... *G09G 2320/0271* (2013.01); *G09G 2320/029* (2013.01); *G09G 2330/021* (2013.01)

(56) References Cited

U.S. PATENT DOCUMENTS

| | | | |
|---|---|---|---|
| 2015/0022560 A1* | 1/2015 | Fu ........................ | G09G 3/3614 |
| | | | 345/209 |
| 2017/0213501 A1* | 7/2017 | Lim ...................... | G09G 3/3688 |
| 2019/0340993 A1* | 11/2019 | Lai ....................... | G09G 3/3674 |
| 2019/0384437 A1* | 12/2019 | Kim ...................... | G06F 3/044 |
| 2021/0216162 A1* | 7/2021 | Fang ..................... | G06F 3/041 |

FOREIGN PATENT DOCUMENTS

| | | | |
|---|---|---|---|
| CN | 106782421 | A | 5/2017 |
| CN | 109739461 | A | 5/2019 |
| CN | 110648639 | A | 1/2020 |
| CN | 110969980 | A | 4/2020 |
| CN | 111223461 | A | 6/2020 |
| CN | 111883079 | A | 11/2020 |
| CN | 113763900 | A | 12/2021 |
| CN | 113823237 | A | 12/2021 |
| CN | 114627837 | A | 6/2022 |
| CN | 115116407 | A | 9/2022 |
| EP | 0492542 | A2 | 7/1992 |

\* cited by examiner

FIG. 9

DRIVING METHOD OF DISPLAY DEVICE, AND DISPLAY DEVICE

CROSS-REFERENCE TO RELATED APPLICATIONS

This application claims the priority and benefit of Chinese patent application 2022105173730, titled "Driving Method of Display Device, and Display Device" and filed May 13, 2022, with China National Intellectual Property Administration, the entire contents of which are incorporated herein by reference.

TECHNICAL FIELD

The present application relates to the field of display technology, and more particularly relates to a driving method of a display device and a display device.

BACKGROUND

The description provided in this section is intended for the mere purpose of providing background information related to the present application but doesn't necessarily constitute prior art.

With people's continuous pursuit of display quality, liquid crystal displays with high refresh rate (e.g., 120 HZ) and high image quality (e.g., 8K) have become the main trend of development for the present.

However, there may be some overload images in a high refresh rate and high image quality panel driver architecture. When displaying an overload image, the data voltage may be frequently switched between a high level and a low level. Due to the large voltage difference before and after switching, the temperature of the source driver will be too high, thereby causing damage to the source driver, making it unable to work normally, and causing a large amount of current consumption, increasing the power consumption of the display device. Therefore, there is an urgent need to propose a technical solution to solve the problem of high power consumption of an overload image.

SUMMARY

In view of the above, it is a purpose of the present application to provide a driving method of a display device and a display device, so as to avoid the problem of high power consumption of a source driver caused by an overload image displayed in the next frame.

The present application discloses a driving method of a display device, including:
  detecting a current pixel inversion mode of the display device;
  determining pixel polarities and corresponding first data signals for a next frame based on pixel polarities of a current frame and the corresponding inversion mode; and
  determining whether the next frame is an overload image based on pixel bright-or-dark values and grayscale values corresponding to the next frame and pixel bright-or-dark values and grayscale values corresponding to an overload image; if the next frame is an overload image, modifying a pixel polarity order corresponding to the first data signals, and generating and outputting second data signals to drive the display device to display the next frame; if the next frame is not an overload image, outputting the first data signals to drive the display device to display the next frame;
  wherein the pixel polarities corresponding to the first data signals are in a different order than the pixel polarities corresponding to the second data signals, and when the pixel polarity order corresponding to the first data signals corresponds to an overload image, the image corresponding to the second data signals is a non-overload image.

Optionally, the step of determining whether the next frame is an overload image based on the pixel bright-or-dark values and grayscale values corresponding to the next frame and the pixel bright-or-dark values and grayscale values of the overload image includes:
  determining whether the next frame is an overload image based on a minimum pixel unit of the next frame; if the number of minimum pixel units of the next frame each of which the pixel bright-or-dark values and grayscale values are identical with the pixel bright-or-dark values and grayscale values of a minimum pixel unit of the overload image is greater than the preset number, then determining the next frame is the overload image.

Optionally, when the inversion mode of the display device is dot inversion, the overload image is divided into a plurality of pixel sections, each pixel section including at least 2*4 pixels, then the pixel drive architecture in each pixel section is as follows:
  the grayscale values corresponding to the pixels in the $S_{4n+1}$ column are all bright; the grayscale values corresponding to the pixels in the $S_{4n+2}$ column are alternately bright, dark, bright and dark; the grayscale values corresponding to the pixels in the $S_{4n+3}$ column are all dark; the grayscale values corresponding to the pixels in the $S_{4n+4}$ column are alternately dark, bright, dark, and bright;
  when the pixel is displayed as bright, the corresponding pixel bright-or-dark value is 111, and when the pixel is displayed as dark, the corresponding pixel bright-or-dark value is 000;
  where the step of determining whether the next frame is an overload image based on the pixel bright-or-dark values and the grayscale values corresponding to the next frame and the pixel bright-or-dark values and the grayscale values of the overload image includes:
  when the pixel bright-or-dark values and grayscale values of every four columns of pixels corresponding to the next frame are consistent with the pixel bright-or-dark values and grayscale values of every four columns of pixels of the overload image, determining that the next frame is the overload image.

Optionally, when the inversion mode of the display device is column inversion, the overload image is divided into a plurality of pixel sections. Each pixel section includes at least 2*4 pixels, and the pixel driving architecture in each pixel section is as follows:
  The grayscale values corresponding to the pixels in the $S_{2n+1}$ column are alternately bright, dark, bright and dark; the grayscale values corresponding to the pixels in the $S_{2n+2}$ column are dark; the grayscale values corresponding to the pixels in the $S_{2n+3}$ column are dark, bright, dark, and bright; and the grayscale values corresponding to the pixels in the $S_{2n+4}$ column are dark;
  when the pixel is displayed as bright, the corresponding pixel bright-or-dark value is 111, and when the pixel is displayed as dark, the corresponding pixel bright-or-dark value is 000;

the step of determining whether the next frame is an overload image based on the pixel bright-or-dark values and the grayscale values corresponding to the next frame and the pixel bright-or-dark values and the grayscale values of the overload image includes:

when the pixel bright-or-dark values and grayscale values of every four columns of pixels corresponding to the next frame are consistent with the pixel bright-or-dark values and grayscale values of every four columns of pixels of the overload image, determining that the next frame an overload image.

Optionally, the grayscale values greater than 50 or less than 30 among the grayscale values of the pixel units in the next frame are compared against the grayscale values greater than 50 or less than 30 among the grayscale values in the pixel units in the overload image so as to determine whether the next frame is the overload image;

when the number of grayscale values greater than 50 or less than 30 in the pixel units in the next frame that are identical with the grayscale values greater than 50 or less than 30 in the pixel units in the overload image is greater than a preset number, determining that the next frame is an overload image.

Optionally, the pixel polarity order corresponding to the overload image is a first polarity order. The pixel polarity order of the image corresponding to the first data signals is a second polarity order. The pixel polarity order of the image corresponding to the second data signals is a third polarity order. The pixel polarity distribution pattern in the first polarity order is identical with the pixel polarity distribution pattern in the second polarity order.

Optionally, a judging step is further included after the step of determining whether the next frame is an overload image based on the pixel bright-or-dark value and the grayscale values corresponding to the next frame and the pixel lightness and dark data and the grayscale values of the overload image, the judging step including:

while the first data signals are output as the data of the next frame, detecting a current value of a half-analog power supply voltage circuit is, and when the current value exceeds a preset current value, determining that the next frame is an overload image, and modifying the first data signals as second data signals to drive the display device to display the next frame.

Optionally, a judging step is further included after the step of determining whether the next frame is an overload image based on the pixel light-dark data and the grayscale values corresponding to the next frame and the pixel light-dark data and the grayscale values of the overload image, the judging step including:

while the second data signals are output as the data of the next frame, detecting a current value of a half-analog power supply voltage circuit, and when the current value is less than the preset current value, determining that the next frame is not a non-overload image, and directly outputting the first data signals to drive the display device to display the next frame.

The present application further discloses a display device, including a detection module, a data signal generation module, a pixel recording module, and a verification and determination module. The detection module is used to detect a current inversion mode of the display device. The data signal generation module generates data signals corresponding to the pixel polarities of a current frame, and generates first data signals for a next frame according to the pixel polarities of the current frame and the inversion mode of the display device. The pixel recording module records the pixel bright-or-dark value of the pixels. The verification and determination module verifies and determines whether the next frame is an overload image based on the pixel bright-or-dark values and grayscale values of the image corresponding to the first data signals. When the next frame corresponding to the first data signals is an overload image, the data signal generation module modifies the pixel polarities corresponding to the first data signals, and generates and outputs second data signals to driving the display device to display the next frame. When the next frame corresponding to the first data signals is a non-overload image, the data signal generation module outputs the first data signals to drive the display device to display the next frame.

Optionally, the display device further includes a current detection circuit and a half-analog power supply voltage circuit. The detection circuit detects a current value of the half-analog power supply voltage circuit. If the current value is less than or equal to a preset current value, a feedback signal is sent to the data signal generation module. The data signal generation module generates and outputs the first data signals to drive the display device to display the next frame. If the current value is greater than the preset current value, a feedback signal is sent to the data signal generation module. The data signal generation module modifies the pixel polarities corresponding to the first data signals, and generates and outputs second data signals to drive the display device to display the next frame.

Compared with the solution that does not judge whether the next frame is an overload image, in the present application a specific overload image is stored in the display device, and when the corresponding data of the next frame triggers the overload image; that is, it is determined whether the next frame is an overload image based on the pixel bright-or-dark values and grayscale values corresponding to the next frame and the grayscale values of the overload image. If the next frame is an overload image, the pixel polarity order corresponding to the first data signals is modified and second data signals are generated and output to drive the display device to display the next frame. If the next frame is not an overload image, the first data signals are output to drive the display device to display the next frame. Through the judgment based on grayscale values, it is verified in advance whether the next frame is an overload image, so as to modify the inversion mode of the liquid crystals to change the pixel polarity order of the next frame, and avoid the current draw from the half-analog power supply voltage (HAVDD) by the pixel configuration corresponding to this image, thereby reducing power consumption and increasing product stability.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", or the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

Figure 1:
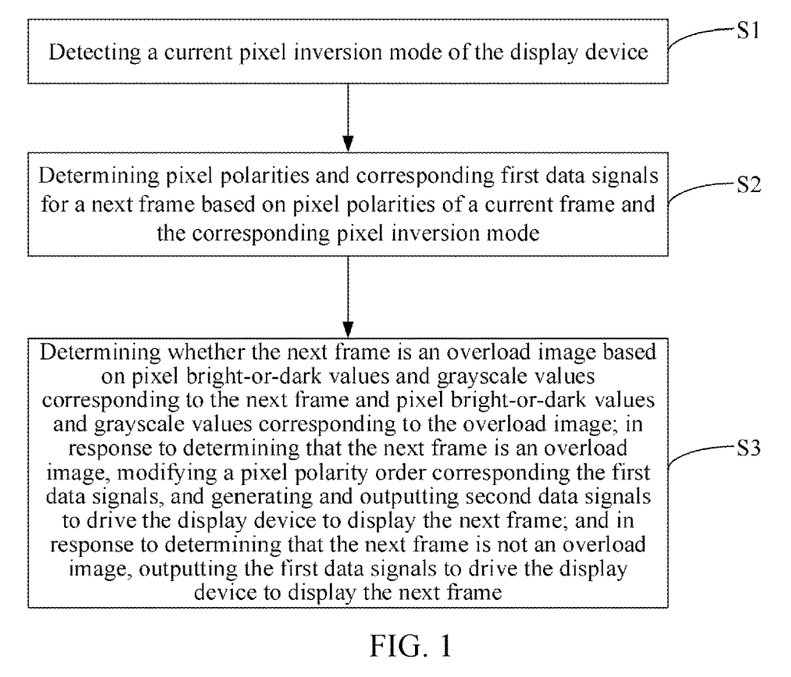
FIG. 1 is a schematic flowchart of a driving method of a display device according to a first embodiment of the present application.

As shown in FIG. 1, as a first embodiment of the present application, a driving method of a display device is disclosed, including:

S1: detecting a current pixel inversion mode of the display device;

S2: determining pixel polarities corresponding first data signals for a next frame based on pixel polarities of a current frame and the corresponding inversion mode; and S3: determining whether the next frame is an overload image based on pixel bright-or-dark values and grayscale values corresponding to the next frame and pixel bright-or-dark values and the grayscale values corresponding to the overload image; if the next frame is an overload image, modifying the pixel polarity order corresponding to the first data signals, and generating and outputting second data signals to drive the display device to display the next frame; if the next frame is not an overload image, outputting the first data signals to drive the display device to display the next frame.

The display device stores a preset overload image. The overload image is mainly based on the image recorded when the HAVDD current exceeds a preset current value during display. Under this image, the current draw from the HAVDD circuit will increase sharply, resulting in high temperature and high load conditions, and usually the image may not be easy to verify, and this special is found through the pixel architecture. The pixel polarities corresponding to the first data signals are in a different order than the pixel polarities corresponding to the second data signals, and when the pixel polarity order corresponding to the first data signals is an overload image, the image corresponding to the second data signals is a non-overload image.

Before the next frame is not displayed, the pixel polarities and the corresponding first data signals for the next frame are determined based on the inversion mode of the display device. Before outputting the first data signals, it is determined whether the next frame is an overload image based on whether the grayscale values corresponding to the next frame is the same as the grayscale values of the overload image. The grayscale values is the main factor affecting the load current, and it is more accurate to determine whether the current image is an overload image by directly judging the grayscale values. If the image is an overload image, then the pixel polarity order corresponding to the first data signals is modified and second data signals are generated and output to drive the display device to display the next frame. If the image is not an overload image, the first data signals are output to drive the display device to display the next frame. The pixel polarities corresponding to the first data signals and the pixel polarities corresponding to the second data signals are in different order. When the pixel polarity order corresponding to the first data signals corresponds to an overload image, the picture corresponding to the modified second data signal corresponds to a non-overload image. A specific overload image is stored under a specific pixel architecture, and a prejudgment is made in advance to avoid excessive power consumption caused by the display of the overload image.

In addition, the corresponding pixel bright-or-dark value is set in the timing control chip for each pixel. For example, 000 represents a dark pixel and 111 represents a bright pixel.

For example, in the pixels in one column of the next frame, taking the first 4 pixels as an example, the bright-or-dark values of the pixels are 111, 000, 111, and 000, respectively. When the bright-or-dark values are the same, the judgment is made based on the grayscale values to ensure the accuracy of the verification of the overload image.

Further, to determine whether the next frame is an overload image, it is needed necessary to detect the grayscale values of all pixels corresponding to the current image. Whether the next frame is an overload image may be determined according to a minimum pixel unit of the next frame. If the number of the minimum pixel units in the next frame each of which the pixel bright-or-dark values and grayscale values are identical with the pixel bright-or-dark values and grayscale values of a minimum pixel unit of the overload image is greater than a preset number, then it is determining that the next frame is an overload image. Taking a 2560*1440 display device as an example, if the pixel structures exceed 1200*100 dots (including pixel bright-or-dark values and grayscale values), it is determined that the conditions are met, and the polarities of all liquid crystals are reversed. Alternatively, the overload image may be divided into multiple minimum detection units, where each multiple minimum detection unit includes at least 4*2 or 2*4 pixels that are adjacent. If the grayscale values of the region in the next frame corresponding to the minimum detection unit of the overload image are consistent with the grayscale values of the minimum detection unit of the overload image, the next frame may also be determined as an overload image.

As the second embodiment of the present application, it is a limitation on the overload image in the above-mentioned embodiment. When the inversion mode of the display device is dot inversion, the overload image is divided into a plurality of pixel sections. Each pixel section includes at least 2*4 pixels, and the pixel driving architecture in each pixel section is as follows.

The grayscale values corresponding to the pixels in the $S_{4n+1}$ column are all bright; the grayscale values corresponding to the pixels in the $S_{4n+2}$ column are alternately bright, dark, bright, and dark; the grayscale values corresponding to the pixels in the $S_{4n+3}$ column are all dark; the grayscale values corresponding to the pixels in the $S_{4n+4}$ column are alternately dark, bright, dark, and bright; when the pixel is displayed as bright, the corresponding pixel bright-or-dark value is 111, and when the pixel is displayed as dark, the corresponding pixel bright-or-dark value is 000.

Then the pixel bright-or-dark values corresponding to the first column of pixels are alternately 111, 111; the pixel bright-or-dark values corresponding to the second column of pixels are alternately 111,000, 111,000; the pixel bright-or-dark values corresponding to the pixels in the third column are alternately 000, 000; and the pixel bright-or-dark values corresponding to the pixels in the fourth column are alternately 000, 111, 000, 111.

Figure 2:
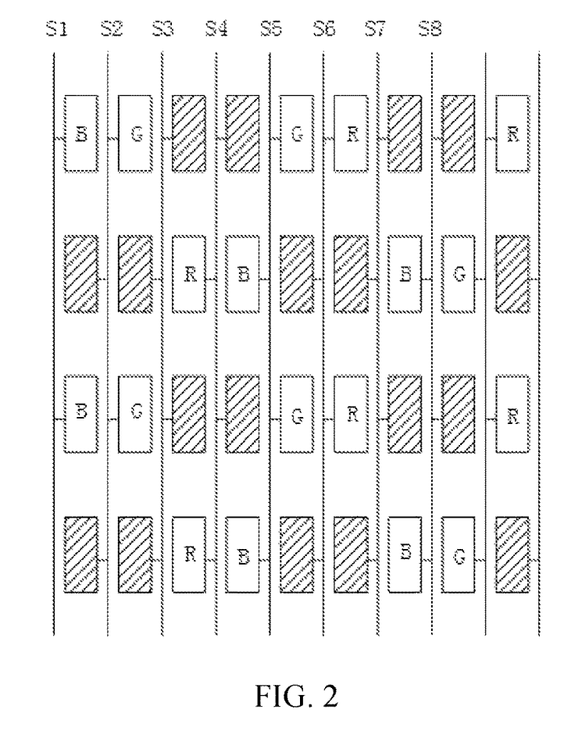
FIG. 2 is a schematic diagram of a pixel unit structure corresponding to an overload image according to a second embodiment of the present application.

The step of determining whether the next frame is an overload image based on the pixel bright-or-dark values and the grayscale values corresponding to the next frame and the pixel bright-or-dark values and the grayscale values of the overload image includes:
when the pixel light-dark data and grayscale values of every four columns of pixels corresponding to the next frame are consistent with the pixel light-dark data and grayscale values of every four columns of pixels of the above-mentioned overload image, it is determined that the next frame is an overload image. For details, refer to FIG. 2 as shown.

Figure 3:
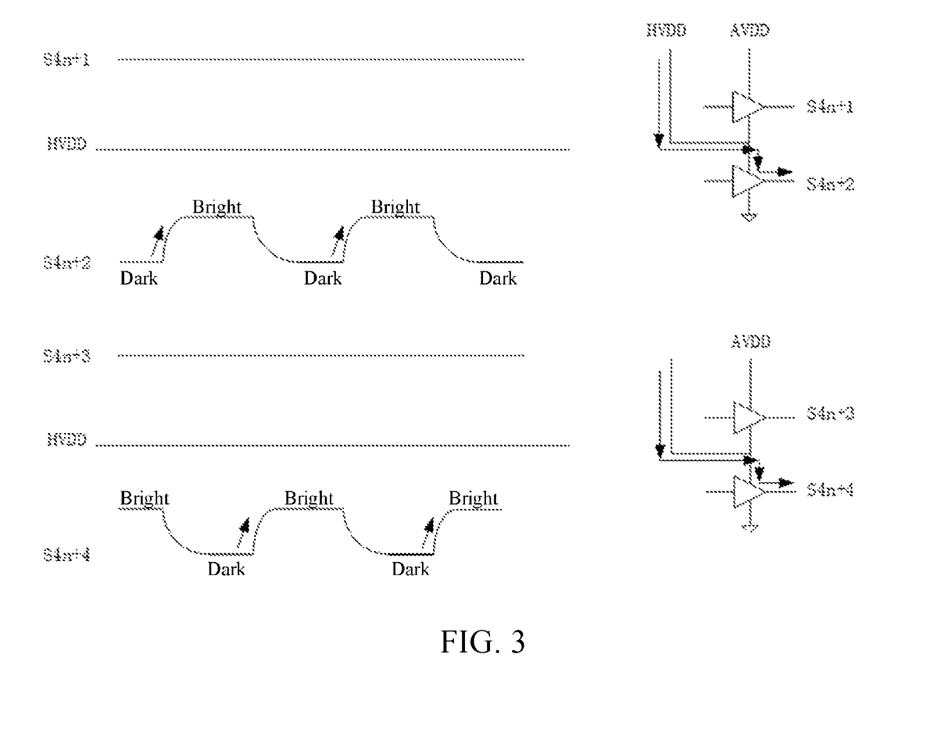
FIG. 3 is a schematic diagram of a load current trend of an overload image according to the second embodiment of the present application.

For example, in the dot-flip structure, taking the above-mentioned pixel section as an example, if the HAVDD load is the largest, the outputs of the source driver chips with the same polarity need to be superimposed in half at the same time. The direction of the arrow in FIG. 3 means that when the current path changes, when the pixel changes from dark to bright, all loads are drawn in the same direction, and this screen is judged to be an overload image. The overload image will have severe current draw relative to the pixel architecture of the dot flip. To avoid current drawing, it is needed to detect whether the pixel bright-or-dark values and grayscale values of the next frame are consistent with the relevant data of the overload image. The voltage of HVDD is small so that when the load is heavy, it is easy to exceed the normal acceptable range or the power consumption of the load IC may be not enough, which will cause the IC to enter the protection state leading to a shutdown so that the display will be turned off. In contrast, AVDD is a power supply voltage, the voltage is relatively large, meaning even if the current is drawn, it will not be affected.

Figure 4:
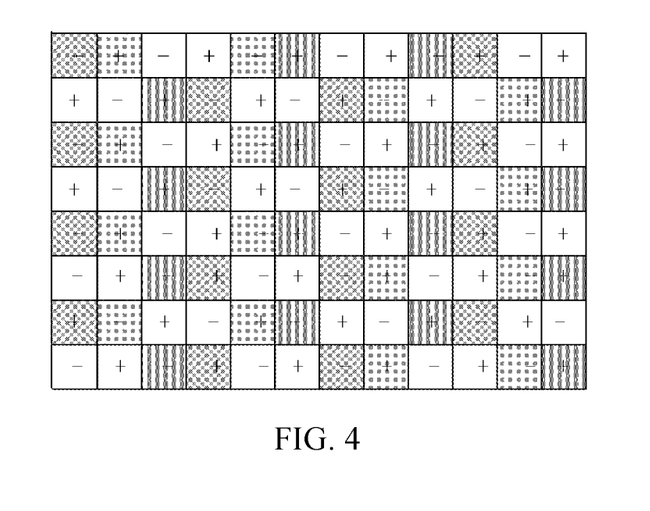
FIG. 4 is a schematic diagram of a pixel structure of a current frame of a display device in a dot inversion mode according to the second embodiment of the present application.
Figure 5:
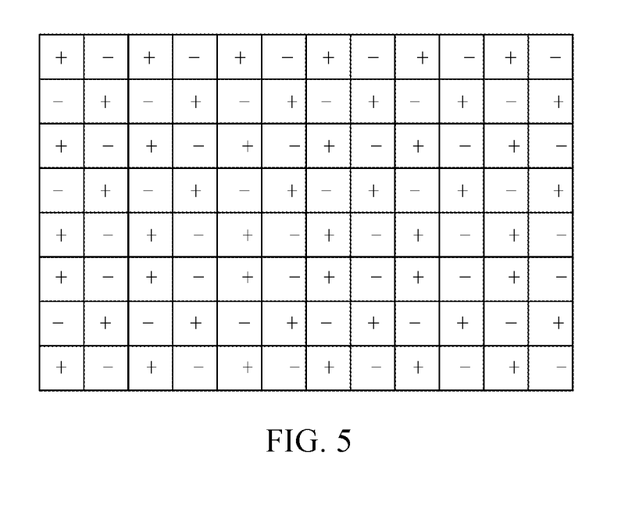
FIG. 5 is a schematic diagram of pixel polarities when the next frame is an overload image according to the second embodiment of the present application.
Figure 6:
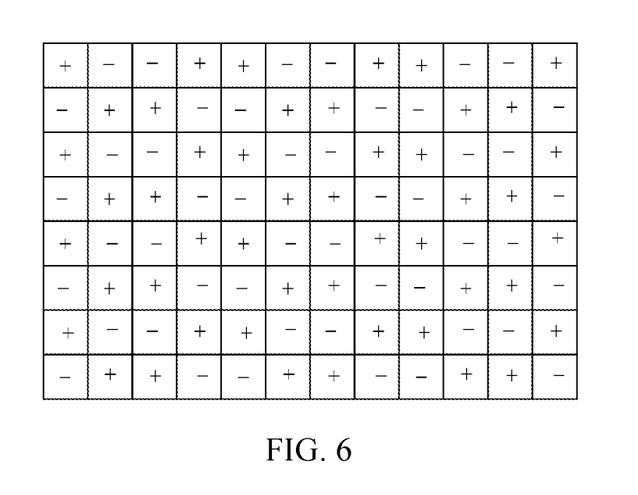
FIG. 6 is a schematic diagram of pixel polarities of an actual next frame with the modified polarity order according to the second embodiment of the present application.

If the pixel inversion mode is dot inversion, the pixel polarities of the current frame are shown in FIG. 4, and the pixel polarities of the next frame are shown in FIG. 5. If it is detected that the next frame is an overload image, then the pixel polarities in FIG. 5 are modified, and the pixel polarities corresponding to the actually output next frame is shown in FIG. 6. Correspondingly, in the process of polarity change, the color of each pixel remains unchanged.

If the inversion mode of the display device is column inversion, the overload image is divided into a plurality of pixel sections, and each pixel section includes at least 2*4 pixels. The pixel driving architecture in each pixel section is as follows.

The grayscale values corresponding to the pixels in the $S_{2n+1}$ column are alternately bright, dark, bright, and dark; the grayscale values corresponding to the pixels in the $S_{2n+2}$ column are dark; the grayscale values corresponding to the pixels in the $S_{2n+3}$ column are alternately dark, bright, dark, and bright; the grayscale values corresponding to the pixels in the $S_{2n+4}$ column are dark. Then the pixel bright-or-dark values corresponding to the first column of pixels are alternately 111,000, 111,000; the pixel bright-or-dark values corresponding to the second column of pixels are alternately 000, 000, 000, 000; the pixel bright-or-dark values corresponding to the third column of pixels are alternately 000, 111, 000, 111; the pixel bright-or-dark values corresponding to the fourth column of pixels are alternately 000, 000, 000, 000. The grayscale values corresponding to the pixels in the $S_{2n+1}$ column and the grayscale values corresponding to the pixels in the $S_{2n+3}$ column may also be alternately dark, bright, dark, and bright. The output ends of the source driver chips need to draw the current from the HVADD in the same direction, and there is an addition trend, and the pixels need to be flipped back and forth, so in H direction it needs be displayed as bright every other line. Since adjacent pixel columns will have an offsetting effect, it is needed to brighten every other column.

The step of determining whether the next frame is an overload image based on the pixel bright-or-dark values and the grayscale values corresponding to the next frame and the pixel bright-or-dark values and the grayscale values of the overload image includes:
when the pixel bright-or-dark values and grayscale values of every four columns of pixels corresponding to the next frame are consistent with the pixel bright-or-dark values and grayscale values of every four columns of pixels of the overload image, determining that the next frame is an overload image.

Figure 7:
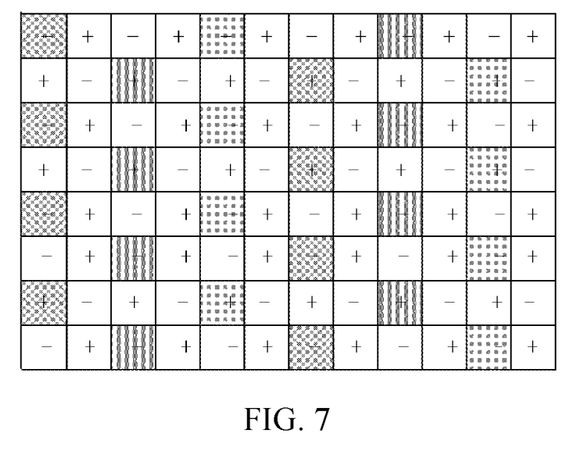
FIG. 7 is a schematic diagram of a pixel structure of a current frame of a display device in a column inversion mode according to the second embodiment of the present application.

If the pixel inversion mode is column inversion, the pixel polarities of the current frame are shown in FIG. 7, and the pixel polarities of the next frame are shown in FIG. 5. If it is determined that the next frame is an overload image, then the pixel polarities in FIG. 5 are modified, and the pixel polarities corresponding to the actually output next frame are shown in FIG. 6. Correspondingly, in the process of polarity change, the color of each pixel remains unchanged.

In display devices of different inversion modes, the overload images are also different. The next frame determined to be the overload image in the dot inversion mode is not necessarily an overload image in the column inversion. However, regardless of whether the display device is of point inversion or column inversion, a comparison is made between the grayscale values greater than 50 or less than 30 among the grayscale values in the pixel units in the next frame and those of the overload image to determine whether the next frame is an overload image.

When the number of grayscale values greater than 50 or less than 30 in the pixel units in the next frame that are identical with the grayscale values greater than 50 or less than 30 in the pixel units in the overload image is greater than the preset number, it is determined that the next frame is an overload image.

Two different inversion modes correspond to different overload images. The overload images in the two different inversion modes do not only refer to the images of the above pixel architectures, but also images of other different architectures. The overload image can be found by detecting the current in the current display picture, and the data of the relevant overload image can be saved as the judgment condition of the overload image.

As another embodiment of the present application, the driving method further includes a judging step. The judging step may be performed after or simultaneously with the step of determining whether the next frame is an overload image based on the grayscale values corresponding to the next frame and the grayscale values of the overload image. When outputting the second data signal as the data of the next frame, a current value of a half-analog power supply voltage circuit is detected. When the current value exceeds a preset current value, if the data signals corresponding to the next frame are the first data signals, it is determined that the next frame is an overload image, and the first data signals are modified to be second data signals to drive the display device to display the next frame.

Taking three frames as an example, the current frame is N-th frame, the next frame is (N+1)th frame, and the still next frame is (N+2)th frame. When it is detected that the next frame is a non-overload image, the first data signals will be output to drive the image of the (N+1)th frame. However, when the (N+1)th frame is displayed, the detected load current exceeds the preset value, so the (N+1)th frame already displayed cannot be changed. However, for the (N+2)th frame, if the grayscale values of the previous (N+1)th frame are still the same, then the first data signals are modified as the second data signals to drive the display device to display the following frame.

When outputting the second data signal as the data of the next frame, the current value of the half-analog power supply voltage circuit is detected. When the current value is less than the preset current value, if the data signals corresponding to the next frame are the first data signals, it is determined that the next frame is a non-overload image, and the first data signals are directly output to drive the display device to display the next frame.

Taking three frames as an example, the current frame is N frame, the next frame is (N+1)th frame, and the next frame is (N+2)th frame. When it is detected that the next frame is an overload image, the second data signals will be output to drive the image of the (N+1)th frame. However, when the (N+1)th frame is displayed, the detected load current does not exceed the preset value, so the (N+1)th frame already displayed cannot be changed. However, for the (N+2)th frame, if the grayscale values of the previous (N+1)th frame are still the same, the first data signals are not modified, but are directly generated and output to drive the display device to display the next frame.

Figure 8:
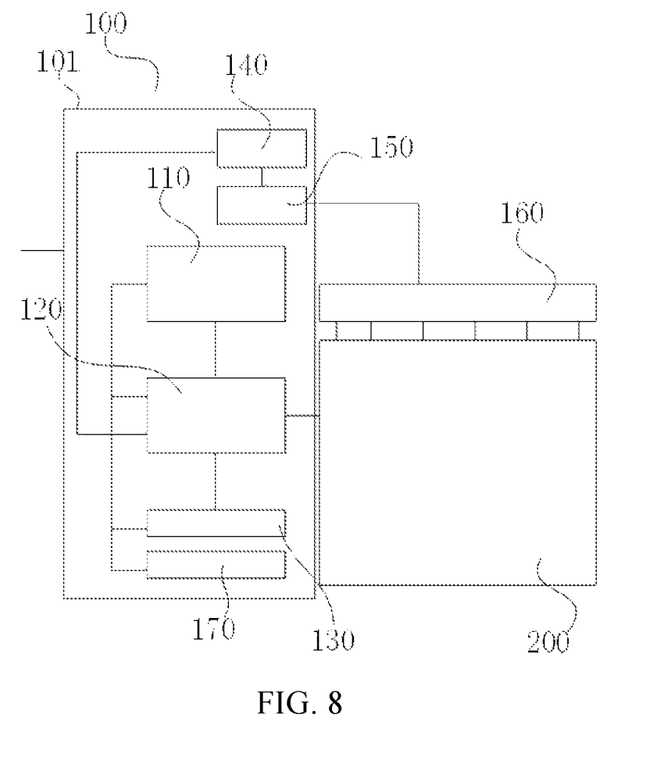
FIG. 8 is a schematic diagram of a display device according to a third embodiment of the present application.

As shown in FIG. 8, as a third embodiment of the present application, a display device 100 is disclosed. The display device 100 includes a timing control chip 101. The timing control chip 101 includes a detection module 110, a data signal generation module 120, a pixel recording module 170, and a verification and determination module 130. The timing control chip 101 is used to receive the relevant data of the front-end (SOC) input image, make judgments through the corresponding modules, and modify the data signals output to the corresponding pixels of the next frame of the display panel. Specifically, the detection module 110 is used to detect a current inversion mode of the display device. The data signal generation module 120 generates data signals corresponding to the pixel polarities of the current frame, and generates first data signals corresponding to the next frame based on the pixel polarities of the current frame and the inversion mode of the display device. The pixel recording module records pixel bright-or-dark values and digital analog signals (111,000, etc.). The verification and determination module 130 verifies and determines whether the next frame is an overload image based on the pixel bright-or-dark values and grayscale values of the image corresponding to the first data signals. When the next frame corresponding to the first data signals is an overload image, the data signal generation module 120 modifies the pixel polarities corresponding to the first data signals, and generates and outputs second data signals to drive the display device to display the next frame. When the next frame corresponding to the first data signals is a non-overload image, the data signal generation module outputs the first data signals to drive the display device to display the next frame.

The display device 100 further includes a current detection circuit 140 and a half-analog power supply voltage circuit 150. The half-analog power supply voltage circuit 150 outputs a half-analog power supply voltage to the source driver chip 160 to control the current on the data lines in the display panel 200. The detection circuit 130 detects a current value of the half-analog power supply voltage circuit 150. If the current value is less than or equal to a preset current value, a feedback signal is sent to the data signal generation module. The data signal generation module generates and outputs first data signals to drive the display device to display the next frame. If the current value is greater than the preset current value, a corresponding feedback signal is sent to the data signal generation module. The data signal generation module modifies the pixel polarities corresponding to the first data signals, so as to generate and output second data signals to drive the display device to display the next frame.

In addition, to prevent a large current, a pull-down circuit 180 may be added. The pull-down circuit 180 is disposed between the half-analog power supply voltage circuit and the source driver chip. For details, see FIG. 9. One end of the pull-down circuit is connected to HAVDD, and the other end is connected to the source driver chip.

Figure 9:
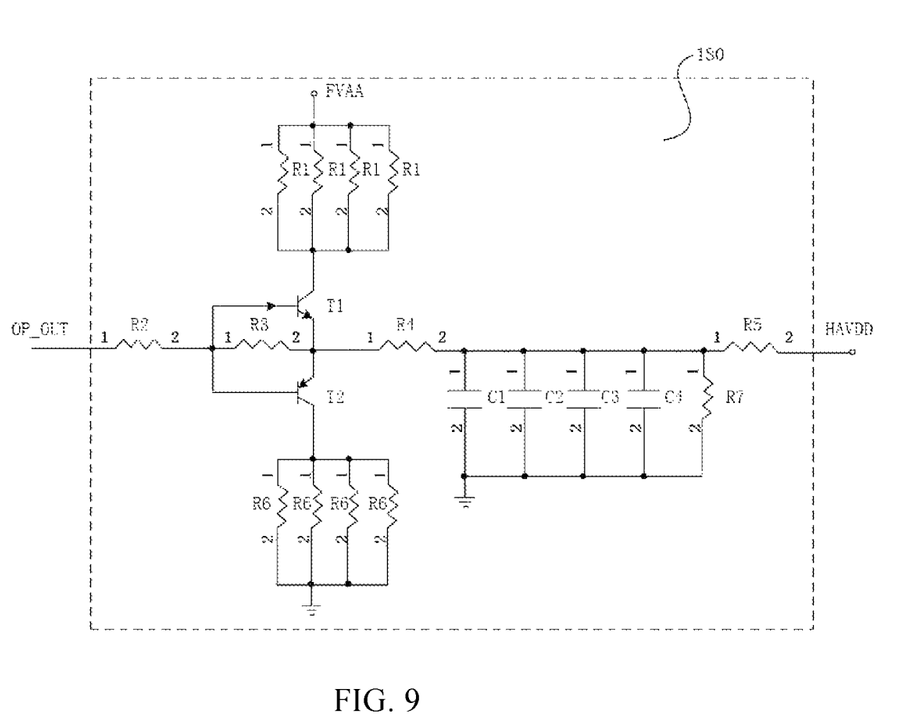
FIG. 9 is a schematic diagram of a pull-down circuit according to a third embodiment of the present application.

Specifically, the pull-down circuit includes multiple resistors, multiple capacitors and two transistors. In the pull-down circuit, resistors R5, R4, R3 and R2 are sequentially connected in series between the input terminal and the output terminal of the half-analog power supply voltage circuit (HAVDD). A plurality of capacitors C1, C2, C3, C4 and resistor R7 are connected in parallel between R4 and R5. One end of a plurality of parallel capacitors C1, C2, C3, C4 and resistor R7 is connected between R4 and R5, and the other end is grounded. The control terminals of the first transistor T1 and the second transistor T2 are connected between R2 and R3. The sources of the second transistor T2 and the first transistor T1 are connected to each other and are both connected between R3 and R4. The drain of the first transistor T1 is connected to a power supply FVAA through a parallel resistor string. The parallel resistor string includes a plurality of resistors R1 connected in parallel. The drain of the second transistor T2 is connected to ground A through a parallel resistor string. The parallel resistor string includes a plurality of resistors R6 connected in parallel. The values of the related resistances and capacitances can be selected depending on the specific panel of the corresponding size. For current detection, the main detection target is the current value at R5, and R5 may be selected as a 0 ohm resistor.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The technical solutions of the present application can be widely used in various display panels, such as TN (Twisted Nematic) display panels, IPS (In-Plane Switching) display panels, VA (Vertical Alignment) display panels, and MVA (Multi-Domain Vertical Alignment) display panels panel. Of course, other types of display panels, such as OLED (Organic Light-Emitting Diode) display panels, may also be applicable to the above solutions.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A driving method of a display device, comprising:
   detecting a current pixel inversion mode of the display device;
   determining pixel polarities and corresponding first data signals for a next frame based on pixel polarities of a current frame and the pixel inversion mode; and
   determining whether the next frame is an overload image based on pixel bright-or-dark values and grayscale values corresponding to the next frame and pixel bright-or-dark values and grayscale values corresponding to the overload image;
   in response to determining that the next frame is an overload image, modifying a pixel polarity order corresponding the first data signals, and generating and outputting second data signals to drive the display device to display the next frame; and
   in response to determining that the next frame is not an overload image, outputting the first data signals to drive the display device to display the next frame;
   wherein the pixel polarities corresponding to the first data signals are in a different order from the pixel polarities corresponding to the second data signals; and wherein when the pixel polarity order corresponding to the first data signals corresponds to an overload image, an image corresponding to the second data signals is a non-overload image;
   wherein the step of determining whether the next frame is an overload image based on pixel bright-or-dark values and grayscale values corresponding to the next frame and pixel bright-or-dark values and grayscale values of the overload image comprises:
   determining whether the next frame is an overload image based on a minimum pixel unit of the next frame;
   in response to determining that a number of minimum pixel units of the next frame each of which the pixel bright-or-dark values and grayscale values are identical with the pixel bright-or-dark values and grayscale values of a minimum pixel unit of the overload image is greater than a preset number, determining that the next frame is the overload image;
   wherein when the inversion mode of the display device is dot inversion, the overload image is divided into a plurality of pixel sections where each pixel section comprise at least 2*4 pixels, and wherein a pixel driving architecture in each pixel section is as follows:
   the grayscale values corresponding to the pixels in $S_{4n+1}$ column are all bright; the grayscale values corresponding to the pixels in $S_{4n+2}$ column are alternately bright, dark, bright, and dark; the grayscale values corresponding to the pixels in $S_{4n+3}$ column are all dark; and the grayscale values corresponding to the pixels in $S_{4n+4}$ column are alternately dark, bright, dark, and bright;
   when the pixel is displayed as bright, the corresponding pixel bright-or-dark value is 111, and when a pixel is displayed as dark, the corresponding pixel bright-or-dark value is 000;
   wherein the step of determining whether the next frame is an overload image based on the pixel bright-or-dark values and the grayscale values corresponding to the next frame and the pixel bright-or-dark values and the grayscale values of the overload image comprises:
   in response to determining that the pixel bright-or-dark values and grayscale values of every four columns of pixels corresponding to the next frame are consistent with the pixel bright-or-dark values and grayscale values of every four columns of pixels of the overload image, determining that the next frame is the overload image.

2. The driving method as recited in claim 1, wherein the grayscale values greater than 50 or less than 30 among the grayscale values of the pixel units in the next frame are compared against the grayscale values greater than 50 or less than 30 among the grayscale values in the pixel units in the overload image, so as to determine whether the next frame is an overload image;
 wherein in response to determining that the number of grayscale values greater than 50 or less than 30 in the pixel units in the next frame that are identical with the grayscale values greater than 50 or less than 30 in the pixel units in the overload image is greater than a preset number, determining that the next frame is an overload image.

3. The driving method as recited in claim 1, wherein the pixel polarity order corresponding to the overload image is a first polarity order, the pixel polarity order of the image corresponding to the first data signals is a second polarity order, and the pixel polarity order of the image corresponding to the second data signals is a third polarity order;
 wherein a pixel polarity distribution pattern in the first polarity order is identical with that in the second polarity order.

4. A display device, comprising:
 a detection module, configured to detect a current pixel inversion mode of the display device;
 a data signal generation module, configured to generate data signals corresponding to pixel polarities of a current frame, and generate first data signals for a next frame according to the pixel polarities of the current frame and an inversion mode of the display device;
 a pixel recording module, configured to record pixel bright-or-dark values of pixels; and
 verification and determination module, configured to verify and determine whether the next frame is an overload image based on the pixel bright-or-dark values and grayscale values of an image corresponding to the first data signals;
 wherein in response to determining that the next frame corresponding to the first data signals is an overload image, the data signal generation module is configured to modify the pixel polarities corresponding to the first data signals, and generate and output second data signals to drive the display device to display the next frame;
 and in response to determining the next frame corresponding to the first data signals is a non-overload image, the data signal generation module is configured to output the first data signals to drive the display device to display the next frame;
 wherein when the inversion mode of the display device is dot inversion, the overload image is divided into a plurality of pixel sections where each pixel section comprises at least 2*4 pixels, and wherein a pixel driving architecture in each pixel section is as follows:
 the grayscale values corresponding to the pixels in S4n+1 column are all bright; the grayscale values corresponding to the pixels in S4n+2 column are alternately bright, dark, bright, and dark; the grayscale values corresponding to the pixels in S4n+3 column are all dark; and the grayscale values corresponding to the pixels in S4n+4 column are alternately dark, bright, dark, and bright;
 when the pixel is displayed as bright, the corresponding pixel bright-or-dark value is 111, and when a pixel is displayed as dark, the corresponding pixel bright-or-dark value is 000;
 wherein the step of determining whether the next frame is an overload image based on the pixel bright-or-dark values and the grayscale values corresponding to the next frame and the pixel bright-or-dark values and the grayscale values of the overload image comprises:
 in response to determining that the pixel bright-or-dark values and grayscale values of every four columns of pixels corresponding to the next frame are consistent with the pixel bright-or-dark values and grayscale values of every four columns of pixels of the overload image, determining that the next frame is the overload image.

5. A driving method of a display device, comprising:
 detecting a current pixel inversion mode of the display device;
 determining pixel polarities and corresponding first data signals for a next frame based on pixel polarities of a current frame and the pixel inversion mode; and
 determining whether the next frame is an overload image based on pixel bright-or-dark values and grayscale values corresponding to the next frame and pixel bright-or-dark values and grayscale values corresponding to the overload image;
 in response to determining that the next frame is an overload image, modifying a pixel polarity order corresponding the first data signals, and generating and outputting second data signals to drive the display device to display the next frame; and
 in response to determining that the next frame is not an overload image, outputting the first data signals to drive the display device to display the next frame;
 wherein the pixel polarities corresponding to the first data signals are in a different order from the pixel polarities corresponding to the second data signals; and wherein when the pixel polarity order corresponding to the first data signals corresponds to an overload image, an image corresponding to the second data signals is a non-overload image;
 wherein the step of determining whether the next frame is an overload image based on pixel bright-or-dark values and grayscale values corresponding to the next frame and pixel bright-or-dark values and grayscale values of the overload image comprises:
 determing whether the next frame is an overload image based on a minimum pixel unit of the next frame;
 in response to determining that a number of minimum pixel units of the next frame each of which the pixel bright-or-dark values and grayscale values are identical with the pixel bright-or-dark values and grayscale values of a minimum pixel unit of the overload image is greater than a preset number, determining that the next frame is the overload image;
 wherein when the inversion mode of the display device is column inversion, the overload image is divided into a plurality of pixel sections where each pixel section comprises at least 2*4 pixels, and wherein a pixel driving architecture in each pixel section is as follows:
 the grayscale values corresponding to the pixels in S2n+1 column are respectively bright, dark, bright, and dar; the grayscale values corresponding to the pixels in S2n+2 column are dark; the grayscale values corresponding to the pixels in S2n+3 column are respectively dark, bright, dark, and bright; and the grayscale values corresponding to the pixels in S2n+4 column are dark;
 wherein when the pixel is displayed as bright, the corresponding pixel bright-or-dark value is 111, and when the pixel is displayed as dark, the corresponding pixel bright-or-dark value is 000;
 wherein the step of determining whether the next frame is an overload image based on the pixel bright-or-dark value and the grayscale values corresponding to the next frame and the pixel bright-or-dark values and the grayscale values of the overload image comprises:

in response to determining that the pixel bright-or-dark values and grayscale values of every four columns of pixels corresponding to the next frame are consistent with the pixel bright-or-dark values and grayscale values of every four columns of pixels of the overload image, determining that the next frame is an overload image.

6. The driving method as recited in claim 5, wherein the grayscale values greater than 50 or less than 30 among the grayscale values of the pixel units in the next frame are compared against the grayscale values greater than 50 or less than 30 among the grayscale values in the pixel units in the overload image, so as to determine whether the next frame is an overload image;

wherein in response to determining that the number of grayscale values greater than 50 or less than 30 in the pixel units in the next frame that are identical with the grayscale values greater than 50 or less than 30 in the pixel units in the overload image is greater than a preset number, determining that the next frame is an overload image.

\* \* \* \* \*